Oct. 10, 1933.  C. H. WILLIS  1,929,729
ELECTRIC VALVE CONVERTING SYSTEM
Filed Dec. 22, 1931
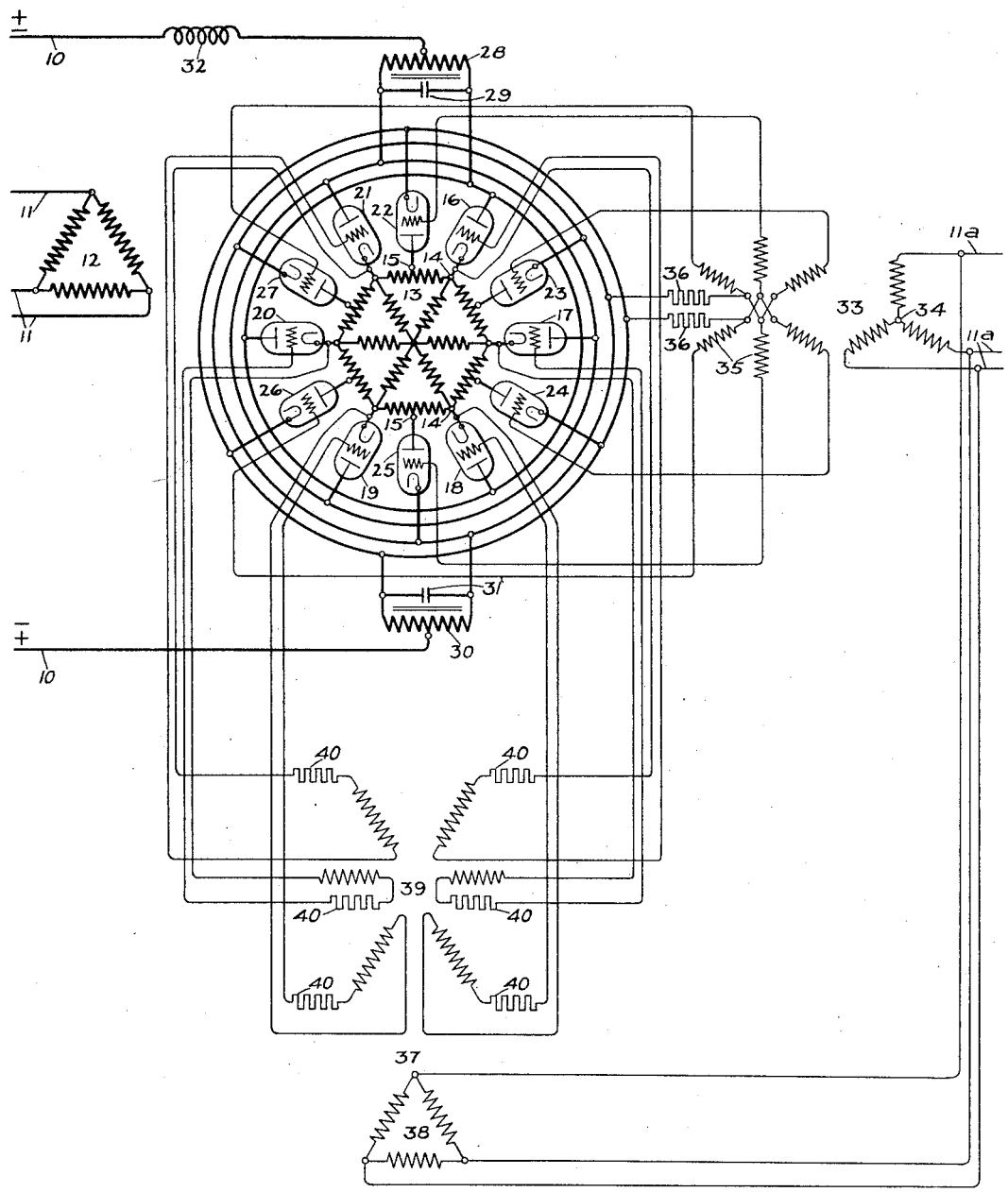
Inventor:
Clodius H. Willis,
by Charles E. Tullar
His Attorney.

Patented Oct. 10, 1933

1,929,729

UNITED STATES PATENT OFFICE 1,929,729

ELECTRIC VALVE CONVERTING SYSTEM

Clodius H. Willis, Princeton, N. J., assignor to General Electric Company, a corporation of New York Application December 22, 1931
Serial No. 582,589

4 Claims. (Cl. 175—363)

My invention relates to electric valve converting systems and more particularly to such systems including electric valves for transmitting energy between direct and alternating current circuits.

Heretofore there have been devised numerous apparatus including electric valves for transmitting energy between direct and alternating current circuits, or alternating current circuits of different frequencies, phases or voltages. The use of vapor electric discharge valves in such apparatus has been found particularly advantageous because of the relatively large amounts of power which may be handled at ordinary operating voltages. On the other hand, the use of valves of this type has imposed certain power factor limitations upon the arrangements of the prior art because of the commutation requirements of this type of valve. It is well understood in the art that the grid of a vapor electric discharge valve is effective to control the starting of current in the valve, but that the current must be interrupted by a circuit external to the valve. In my copending applications, Serial Nos. 566,367 and 566,372, filed October 1, 1931, and assigned to the same assignee as the present application, there are disclosed certain electric valve converting systems which are adapted to the requirements of valves of the vapor electric discharge type and which have substantially eliminated the power factor limitations of such arrangements of the prior art. Certain features described in the present application are disclosed and broadly claimed in the aforesaid applications. In these copending applications there are disclosed electric valve converting apparatus of the type including an inductive network, a plurality of electric valves, and means for introducing into the apparatus an alternating potential effective to commutate the current between the valves against the electromotive force of the inductive winding interconnecting the valves, which normally opposes such commutation under certain power factor conditions. In valve converting apparatus of this type it is well understood that the current wave form on the alternating current circuit is improved substantially with an increase in the number of phases, while on the other hand an increase in the number of phases tends to complicate the apparatus somewhat and to increase the ratio of peak current to average current of the several electric valves, a factor which may affect their cost disadvantageously.

It is an object of my invention, therefore, to provide an improved electric valve converting system for transmitting energy between direct and alternating current circuits which will overcome the above mentioned disadvantages of the arrangements of the prior art and which will be simple and reliable in operation.

It is a further object of my invention to provide an improved electric valve converting system for transmitting energy between direct and alternating current circuits which will secure the benefits of an increased number of phases without actually increasing the number of phases.

In accordance with an embodiment of my invention, direct and alternating current circuits are interconnected through a polyphase inductive network and a plurality of electric valves. The inductive network is provided with a plurality of symmetrically spaced phase terminals which are interconnected with one side of the direct current circuit through a group of the electric valves. The network is provided also with a plurality of symmetrically spaced terminals intermediate the phase terminals and these intermediate terminals are interconnected with the other side of the direct current circuit through another group of electric valves. In this way the valves connected to the positive side of the direct current circuit or "positive" valves are staggered with respect to the "negative" valves with the result that the direct current is commutated alternately between the positive and negative valves rather than simultaneously, as in the arrangements of the prior art. The effect of this staggering of the positive and negative valves is to give an operation equivalent to that of an apparatus having double the number of phases.

For a better understanding of my invention, together with other and further objects thereof, reference is had to the following description taken in connection with the accompanying drawing, and its scope will be pointed out in the appended claims. The single figure of the accompanying drawing illustrates a system embodying my invention for transmitting energy between a direct current circuit and a three-phase alternating current circuit in which the connections are such as to give an operation equivalent to a twelve-phase converting system.

Referring now to the drawing, there is illustrated an arrangement for transmitting energy between a direct current circuit 10 and a three-phase alternating current circuit 11. This arrangement includes a transformer comprising a three-phase network 12 connected to the circuit 11 and an inductively coupled six-phase network 13 for connection to the direct current circuit.

The network 13 is provided with six-phase terminals 14 and a similar number of symmetrically spaced intermediate terminals 15, each having a phase relation substantially midway between adjacent phase terminals 14. A group of electric valves 16–21, inc., are connected to the several phase terminals 14 for connecting the network 13 to one side of the direct current circuit. Similarly, a second group of valves, 22–27, inc., are connected to the intermediate terminals 15 for interconnecting the network 13 with the negative side of the direct current circuit. The several electric valves 16–27, inc., are each provided with an anode, a cathode, and a control grid, and may be of any of the several types well known in the art, although I prefer to use valves of the vapor electric discharge type. Interposed in the connection between the group of valves 16–21, inc., and the direct current circuit is a commutating winding 28 provided with an electrical midpoint connected to one side of the direct current circuit, and a pair of end terminals each connected to the electric valves of the group 16–21, inc., associated with alternate phase terminals of the network 13. A commutating capacitor 29 is connected between the terminals of reactor 28. Similarly, the group of electric valves 22–27. inc., is connected to the other side of the direct current circuit 10 through a commutating reactor 30 and capacitor 31. In order to control the grids of the several electric valves 16–27, inc., in the same phase sequence in which they are connected to the inductive network 13, there are provided grid transformers 33 and 37. The transformer 33 comprises the primary winding 34 and two Y-connected secondary windings 35 connected to excite the group of valves 22–27, inc., of similar phase relation through current limiting resistors 36. The transformer 37 comprises a delta connected primary winding 38 and six secondary phase windings 39 connected to excite the grids of the group of valves 16–21, inc., of corresponding phase through current limiting resistors 40. The primary windings 34 and 38 are illustrated as being connected to a three-phase alternating current circuit 11a of the frequency which it is desired to supply to the alternating current circuit 11, or in case the circuit 11 is connected to an independent source of electromotive force for determining its frequency, the windings 34 and 38 may be connected directly thereto. In case the valves 16–27, inc., are of the vapor electric discharge type, the grid transformers 33 and 37 should be self-saturating or self-saturating transformers should be interposed between these transformers and the several valve grids or some other means should be provided for converting the sinusoidal potential of the alternating current circuit 11 to one of peaked wave form for exciting the grids of the several electric valves, since each of the several electric valves should be rendered conductive for a period less than 60 electrical degrees. However, this feature of exciting the grid of a vapor electric discharge valve with a periodic potential of peaked wave form comprises no part of my present invention, but is disclosed and broadly claimed in the copending application of B. D. Bedford, Serial No. 485,335, filed September 29, 1930, and assigned to the same assignee as the present application.

In explaining the operation of the above described apparatus, it will be assumed that it is desired to transmit energy from the direct current circuit 10 to the alternating current circuit 11 and that, initially, electric valves 21 and 25 are conductive. Current will then flow from the upper positive direct current terminals through the left hand portion of the reactor 28, electric valve 21, inductive network 13, electric valve 25, the right hand portion of reactor 30, to the negative side of the direct current circuit. During the interval in which current is flowing to the left hand portion of reactor 28, this current must be balanced by current flowing in the right hand portion, which, neglecting the magnetizing admitance of the reactor 28, will be equal in magnitude. The only path for this current through the right hand portion of reactor 28 includes capacitor 29, with the result, that during this interval, the capacitor 29 becomes charged to such a potential that when electric valve 16 is rendered conductive, it is effective to commutate the current from the valve 21 to the valve 16 even under power factor conditions such that the electromotive force of the network interconnecting the valves 21 and 16 opposes such commutation. Thirty electrical degrees after the valve 16 has become conductive, the valve 26 is rendered conductive and the current is commutated from the valve 25 to the valve 26 by the potential of capacitor 31 in a similar manner. In this manner the current is successively transferred between adjacent valves of the groups 16–21, inc., and 22–27, inc., respectively, the commutation in one group of tubes being staggered with respect to that in the other group of tubes. The result is that the axis of conduction through the network 13 progressively rotates at a frequency dependent upon the frequency of the grid excitation, thus producing an alternating current in the circuit 11. It is to be noted that the progressive rotation of the axis of conduction is a step-by-step movement, thus producing an alternating current in the alternating current circuit 11 of stepped wave form. It will be noted also, that the approximation of the stepped wave to a sinusoidal wave increases with an increase in the number of phases, that is, an increase in the number of steps per cycle. By staggering the tubes connected to one side of the direct current circuit with respect to the tubes connected to the other side of the direct current circuit, it is seen that there are twice as many steps per cycle so that the approximation of the current in the circuit 11 to a sine wave is materially closer. In cases where it is desirable to include a smoothing reactor 32 in the direct current circuit, its kva. capacity, with the arrangement described above, need be only half that of a conventional six-phase system. It will be apparent to those skilled in the art that the operation of the above described apparatus will be substantially identical when transmitting energy in the opposite direction; that is, when operating as a rectifier and transmitting energy from the alternating current circuit 11 to the direct current circuit 10. In case the alternating current circuit 11 is connected to an independent source of electromotive force, it will be apparent that the power factor conditions on the alternating current may be regulated by means of a rotary phase shifting transformer interposed in the connections of the grid transformers 33 and 38 to the control, as is well understood by those skilled in the art.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. In an electric valve converting system, the combination of a direct current circuit, an alternating current circuit, a polyphase inductive network, a group of electric valves interconnecting said network and one side of said direct current circuit, and a group of other electric valves interconnecting the network and the other side of the direct current circuit, said groups of valves being connected in staggered relation to said network.

2. In an electric valve converting system, the combination of a direct current circuit, an alternating current circuit, a polyphase inductive network, a group of electric valves interconnecting the positive side of said direct current circuit and said network, a group of other electric valves interconnecting the negative side of said direct current circuit and said network, the connections of corresponding valves of said groups being displaced from diametral points of said network by substantially half the angle between adjacent phases.

3. In an electric valve converting system, the combination of a direct current circuit, an alternating current circuit, a polyphase inductive network provided with a plurality of phase terminals, a group of electric valves interconnecting said terminals and one side of said direct current system, said network being provided also with a plurality of symmetrically spaced terminals intermediate said phase terminals, and a second group of electric valves interconnecting said intermediate terminals with the other side of said direct current circuit.

4. In an electric valve converting system, the combination of a direct current circuit, an alternating current circuit, a polyphase inductive network provided with a plurality of phase terminals, a group of electric valves, an inductive winding provided with an electrical midpoint connected to one side of said direct current circuit and with a pair of end terminals, each connected to the valves of said group associated with alternate phase terminals, said network being provided also with a plurality of symmetrically spaced terminals intermediate said phase terminals, a second group of valves and a second inductive winding similarly interconnecting said intermediate terminals and the other side of said direct current circuit, and means for producing across said inductive windings an alternating potential the frequency of which is a harmonic of that of said alternating current circuit for commutating the current between said valves under any desired power factor conditions on said alternating current circuit.

CLODIUS H. WILLIS.